(12) United States Patent
Chiritoiu et al.

(10) Patent No.: US 10,946,952 B2
(45) Date of Patent: Mar. 16, 2021

(54) AIRCRAFT LANDING GEAR ASSEMBLY

(71) Applicant: Safran Landing Systems UK LTD, Gloucester (GB)

(72) Inventors: Radu Chiritoiu, Bristol (GB); Daniele Parente, Gloucester (GB)

(73) Assignee: Safran Landing Systems UK LTD

( * ) Notice: Subject to any disclaimer, the term of this patent is extended or adjusted under 35 U.S.C. 154(b) by 309 days.

(21) Appl. No.: 15/917,148

(22) Filed: Mar. 9, 2018

(65) Prior Publication Data
US 2018/0265184 A1 Sep. 20, 2018

(30) Foreign Application Priority Data
Mar. 17, 2017 (EP) ..................................... 17161557

(51) Int. Cl.
*B64C 25/58* (2006.01)
*B64C 25/34* (2006.01)

(52) U.S. Cl.
CPC .............. *B64C 25/58* (2013.01); *B64C 25/34* (2013.01)

(58) Field of Classification Search
CPC .. B64C 25/34; B64C 25/345; B64C 2025/008
See application file for complete search history.

(56) References Cited

U.S. PATENT DOCUMENTS

| | | | |
|---|---|---|---|
| 2,421,871 A | 6/1947 | Dowty G | |
| 3,162,403 A | 12/1964 | Hoke | |
| 5,944,147 A * | 8/1999 | Berwanger | F16D 55/36 188/71.5 |
| 9,446,775 B2 * | 9/2016 | Yoshizu | B61F 5/52 |
| 2006/0284009 A1 | 12/2006 | Kismarton | |
| 2007/0007386 A1 | 1/2007 | Coupe et al. | |
| 2007/0228210 A1 | 10/2007 | Mast et al. | |
| 2010/0108423 A1 | 5/2010 | Keel | |
| 2018/0037316 A1 * | 2/2018 | Dubrulle | B64C 25/34 |

FOREIGN PATENT DOCUMENTS

| | | |
|---|---|---|
| CN | 105480410 A | 4/2016 |
| CN | 105836110 A | 8/2016 |
| DE | 202013105380 U1 | 1/2014 |

(Continued)

OTHER PUBLICATIONS

Zeinoddini, V. and Schafer, B. W., Nov. 3, 2010, "Impact of Corner Radius on Cold-formed Steel Member Strength" (2010). International Specialty Conference on Cold-Formed Steel Structures. 1. https://scholarsmine.mst.edu/cgi/viewcontent.cgi?article=1307 &context=isccss (Year: 2010).*

(Continued)

*Primary Examiner* — Richard R. Green
*Assistant Examiner* — Arfan Y. Sinaki
(74) *Attorney, Agent, or Firm* — RatnerPrestia

(57) ABSTRACT

An aircraft landing gear assembly including a structural load bearing beam arranged, in use, to react torsional loads applied to it. The beam has a tubular box section main body having four straight sidewall portions, adjacent sidewall portions being orthogonal to one another and connected by rounded corner portions. Each corner portion has a radius of between 10% and 40% of the width and/or height of the tubular box section main body.

8 Claims, 2 Drawing Sheets

(56) References Cited

FOREIGN PATENT DOCUMENTS

| | | |
|---|---|---|
| EP | 2883779 A1 | 6/2015 |
| FR | 2979612 A1 | 3/2013 |
| GB | 565052 | 10/1944 |
| GB | 961644 | 6/1964 |
| GB | 2474686 A | 4/2011 |
| WO | 2009093223 A1 | 7/2009 |

OTHER PUBLICATIONS

European Search Report for European Application No. 17161557.8, dated Aug. 16, 2017, 8 Pages.
European Communication Pursuant to Article 94(3) EPC for European Application No. 17 161 557.8, dated May 29, 2020, 4 pages.

* cited by examiner

AIRCRAFT LANDING GEAR ASSEMBLY

This application claims the benefit of and priority to European Application EP17161557.8, filed on Mar. 17, 2017, the contents of which are incorporated herein by reference.

BACKGROUND

A typical arrangement of the main landing gear of medium to large aircraft includes a telescopic shock absorbing landing gear strut pivotally connected to a bogie beam to which a number axles and wheel pairs are mounted.

Certain aircraft landing gear components, such as a bogie beam or side stay, experience torsional loads in use. The components are sized to have appropriate torque reaction and strength properties, which can make them heavy.

The present inventors have identified that the weight of an aircraft landing gear can be reduced.

SUMMARY

In accordance with a first aspect of the invention, there is provided an aircraft landing gear assembly including a beam arranged, in use, to react torsional loads applied to it, wherein the beam includes a tubular box section main body having four flat side walls, wherein adjacent sidewalls are orthogonal to one another and connected by rounded corner portions, each corner portion having a radius of between 10% and 40% of the width and/or height of the tubular box section main body.

Thus, an aircraft landing gear according to the first aspect includes a box section beam arranged to react torsion loading. That is, in a cross section perpendicular to the longitudinal axis of the beam, the tubular main body has four generally straight sidewall portions connected via curved corner portions. The present inventors have discovered that such a box section beam has improved torque reaction and strength in comparison to known beams such as relatively square cornered box section and circular section beams. As such, the size and weight of the box section beam can be reduced relative to known beams. Also, a box section beam according to the first aspect facilitates the mounting of components such as sensors, hydraulic lines and electrical wiring on the straight sidewall portions.

One or more, or each, of the corner portions can each have a radius of between 15% and 35% of the width and/or height of the tubular box section main body, or more preferably between 20% and 30% of the width and/or height of the tubular box section main body. The present inventors found that between 20% and 30% provides a particularly effective profile for torque reaction and strength. The most preferred radius is 25% of the width and/or height of the tubular box section main body. The present inventors found that 25% provides an optimum profile for torque reaction and strength.

The width of the beam can be equal to the height of the beam.

The beam can have the box section profile along a majority of its length. The beam can include one or more non-box section profile portions. Alternatively, the entire length of the beam can have a box section profile.

The beam can be distinct from the main strut of the landing gear assembly.

The landing gear assembly can comprise a bogie beam movably, such as pivotally, coupled to a shock absorbing strut, the bogie beam comprising the beam.

The landing gear can comprise a side stay, the side stay comprising the beam or a second beam which is identical to the first beam.

In accordance with a second aspect of the invention, there is provided an aircraft including one or more aircraft landing gear according to the first aspect.

BRIEF DESCRIPTION OF THE DRAWINGS

By way of example only, certain embodiments of the invention will now be described by reference to the accompanying drawings, in which.

DETAILED DESCRIPTION

Figure 1:
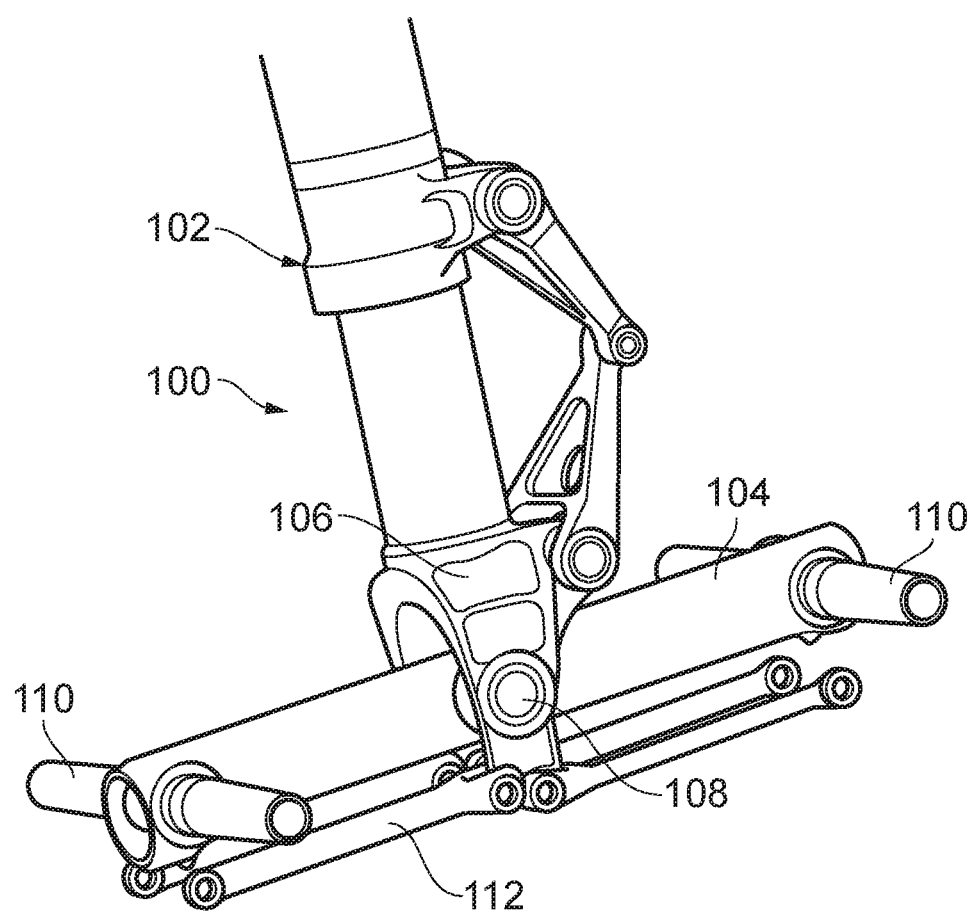
FIG. 1 is a schematic diagram of a known aircraft landing gear assembly.

Part of an aircraft is shown in FIG. 1. More specifically, a known aircraft landing gear assembly of the aircraft is schematically illustrated. The landing gear assembly 100 comprises a shock absorber strut 102 that is arranged to be coupled to an aircraft at a first, upper, end (not shown) and operated to be stowed or deployed in a conventional manner. At the second, lower, end of the shock absorber strut 102 the strut is pivotally coupled to a bogie beam 104. The bogie beam 104 has a circular cross sectional profile. A typical arrangement of the lower end of the sliding tube of the shock absorber strut 102 includes a forked yoke 106 extending either side and below the bogie beam 104. A pivot pin 108 pivotally couples the bogie beam 104 to the yoke 106. The bogie beam 104 generally includes two or more axles 110 on which aircraft wheel and brake assemblies (not shown) are mounted. A brake rod 112 couples each brake assembly to a lower extension of the yoke 106 to react brake torque.

Certain aircraft landing gear components such as the bogie beam 104 and side stays (not shown) can experience torsional loads in use. The components are sized to have appropriate torque reaction and strength properties, which can make them heavy. The present inventors have identified that the weight of an aircraft landing gear can be reduced by modifying the sectional profile of torsionally loaded components such as the bogie beam.

Figure 2:
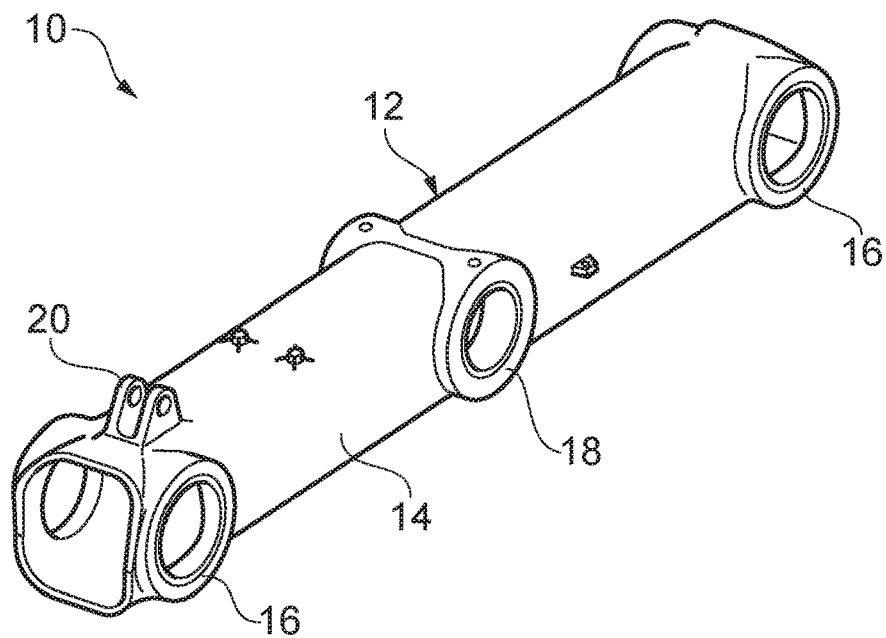
FIG. 2 is a schematic diagram of part of an aircraft landing gear assembly according to an embodiment of the invention.

Referring now to FIG. 2, an aircraft landing gear assembly according to an embodiment of the invention is shown generally at 10. The landing gear assembly 10 is identical to the landing gear assembly of FIG. 1 except for the bogie beam 12. For clarity, only the bogie beam 12 is shown in FIG. 2.

Figure 3:
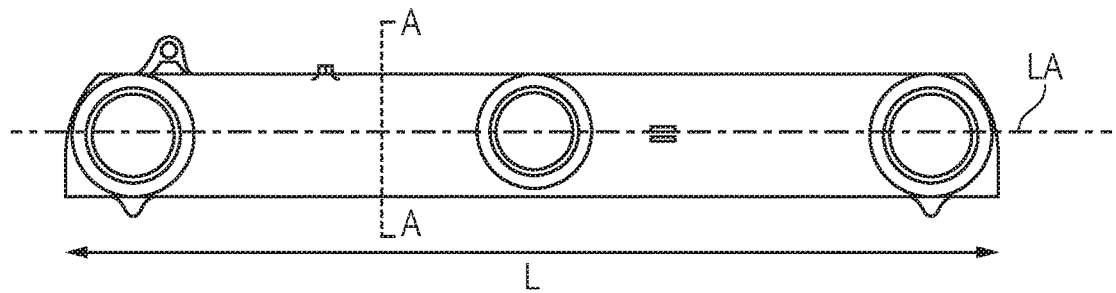
FIG. 3 is a side view of the bogie beam of the aircraft landing gear assembly of FIG. 2.
Figure 4:
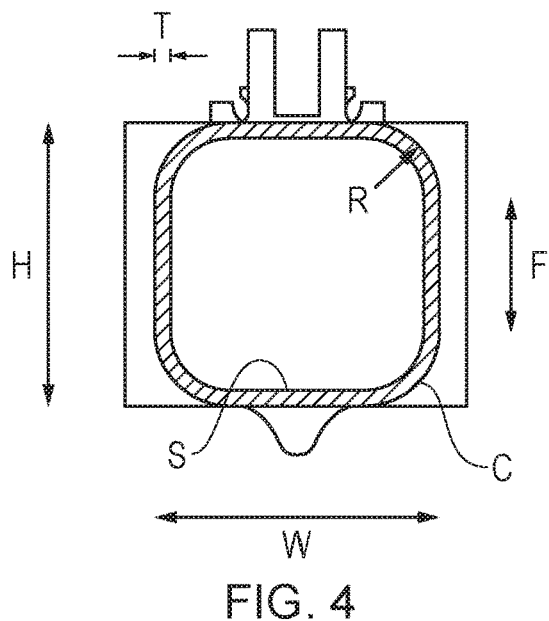
FIG. 4 is a section view through A-A of the bogie beam of FIG. 3.

Referring additionally to FIGS. 3 and 4, the bogie beam 12 differs from the bogie beam 104 of FIG. 1 in that it has a box section profile, rather than a circular profile. The bogie beam 12 has a tubular main body 14 which in this example extends the full length L of the bogie beam 12. The main body 14 has a cross sectional profile through A-A that is generally square with four straight sidewalls S connected by rounded corner portions C.

Each rounded corner portion C has an outer radius R which is 25% of the width W and height H of the tubular box section main body 14. The present inventors found that a 25% ratio provides an optimum profile for torque reaction and strength. The width W of the tubular main body 14 is equal to the height H in this embodiment. Each sidewall S therefore has a width F which is equal to width W or height T minus twice the corner radius R.

In other embodiments, one or more, or each, of the corner portions C can each have a radius of between 10% and 40% of the width and/or height of the tubular box section main body, preferably between 15% and 35% of the width and/or height of the tubular box section main body, or more preferably between 20% and 30% of the width and/or height of the tubular box section main body.

The tubular main body 14 has a thickness T of between 9 mm and 18 mm for example. The tubular main body 14 can be of uniform thickness T around and along the body 14.

The bogie beam 12 includes a pair of axle mounting flanges 16 which project either side from the tubular main body 14. In other embodiments the bogie beam can be arranged to mount more than two axles.

The bogie beam 12 includes a bogie pivot flange 18 arranged to receive a bogie pivot pin (not shown) for pivotally coupling the bogie beam 12 to the sliding tube of a shock absorbing strut (not shown). The bogie pivot flange 18 projects either side from the tubular main body 14.

The bogie beam includes a pair of attachment lugs 20 for pivotally coupling the bogie beam 12 to a pitch trimming actuator (not shown) for positioning the bogie beam 12 relative to the shock absorbing strut.

However, in other embodiments the bogie beam can take any suitable form having a box section tubular body.

In other embodiments, the landing gear assembly can include other beams arranged in use to react torsional loading and having a box section as described herein. In any embodiment, the width and/or height of the beam can vary along its length providing the corner portions can each have a radius of between 10% and 40% of the width and/or height of the tubular box section main body.

Box section beams of landing gear assemblies according to embodiments of the invention can be manufactured from conventional materials such as stainless steel, aluminum and titanium using conventional manufacturing processes.

The landing gear assembly according to embodiments of the invention may be a main landing gear assembly.

It should be noted that the above-mentioned embodiments illustrate rather than limit the invention, and that those skilled in the art will be capable of designing many alternative embodiments without departing from the scope of the invention as defined by the appended claims.

The invention claimed is:

1. An aircraft landing gear assembly including a structural load bearing beam arranged, in use, to react torsional loads applied to it, at least a portion of the beam including a hollow tubular box section profile in a plane perpendicular to a long axis of the beam defined by:
    four straight sidewall portions, adjacent sidewall portions being orthogonal to one another; and
    four rounded corner portions connecting each adjacent pair of the four straight sidewall portions;
    wherein the four straight sidewall portions and the four rounded corner portions define a main body with a hollow tubular box section profile having a width and a height; and
    each corner portion has a radius of between 10% and 40% of the width and/or height of the hollow tubular box section profile;
    wherein the beam comprises a bogie beam movably coupled to a shock absorbing strut; and
    wherein the hollow tubular box section profile extends from a bogie pivot flange configured to receive a bogie pivot pin to at least one axle mounting flange configured to receive a respective axle.

2. The aircraft landing gear assembly according to claim 1, wherein one or more of the corner portions each has a radius of between 15% and 35% of the width and/or height of the hollow tubular box section profile.

3. The aircraft landing gear assembly according to claim 2, wherein one or more of the corner portions each has a radius of between 20% and 30% of the t width and/or height of the hollow tubular box section profile.

4. The aircraft landing gear assembly according to claim 3, wherein radius one or more of the corner portions each has a radius of 25% of the width and/or height of the hollow tubular box section profile.

5. The aircraft landing gear assembly of according to claim 4, wherein all of the corner portions has a radius of 25% of the width and/or height of the hollow tubular box section profile.

6. The aircraft landing gear assembly according to claim 1, wherein the width of the tubular box section main body is equal to the height of the hollow tubular box section profile.

7. The aircraft landing gear assembly according to claim 1, wherein the beam has the hollow tubular box section profile along a majority of a length of the beam.

8. An aircraft including one or more aircraft landing gear assemblies according to claim 1.

* * * * *